United States Patent [19]

Koop

[11] Patent Number: 4,585,237
[45] Date of Patent: Apr. 29, 1986

[54] PISTON AND OIL CONTROL RING THEREFOR

[75] Inventor: Dale W. Koop, Hastings, Mich.

[73] Assignee: Hastings Manufacturing Company, Hastings, Mich.

[21] Appl. No.: 3,248

[22] Filed: Jan. 15, 1979

[51] Int. Cl.[4] .............................................. F16J 9/12
[52] U.S. Cl. ..................................... 277/139; 267/1.5
[58] Field of Search ............... 277/138, 139, 140, 156, 277/143, 216, 217, 218, 222; 267/1.5

[56] References Cited

U.S. PATENT DOCUMENTS

| | | | |
|---|---|---|---|
| 1,523,828 | 1/1925 | Wilson | 277/217 |
| 2,293,450 | 8/1942 | Wilkening | 267/1.5 |
| 2,656,230 | 10/1953 | Phillips | 277/139 |
| 2,854,301 | 9/1958 | Lutz | 267/1.5 |
| 2,904,377 | 9/1959 | Endres et al. | 277/139 |
| 2,970,022 | 1/1961 | Anderson | 277/139 |
| 3,522,949 | 8/1970 | Wells | 267/1.5 X |
| 3,814,444 | 6/1974 | Johnson et al. | 277/139 |

OTHER PUBLICATIONS

Engineer's Handbook—of piston rings—Ninth Edition Koppers Company, Inc., Metal Products Division, Baltimore, Maryland 21203—Copyright 1975, pp. 19, 150 and 715 and 142.

Primary Examiner—Robert S. Ward
Attorney, Agent, or Firm—Austin A. Webb

[57] ABSTRACT

A piston having a ring groove therearound has a three part oil control ring in the groove. The ring includes an axially and radially corrugated expander and two flat annular rails retained by the sides of the groove. The radial wall thickness of the rails is no more than 3% of the diameter of the piston; and the radial wall thickness of the expander is no more then 4.7% of the diameter of the piston.

12 Claims, 4 Drawing Figures

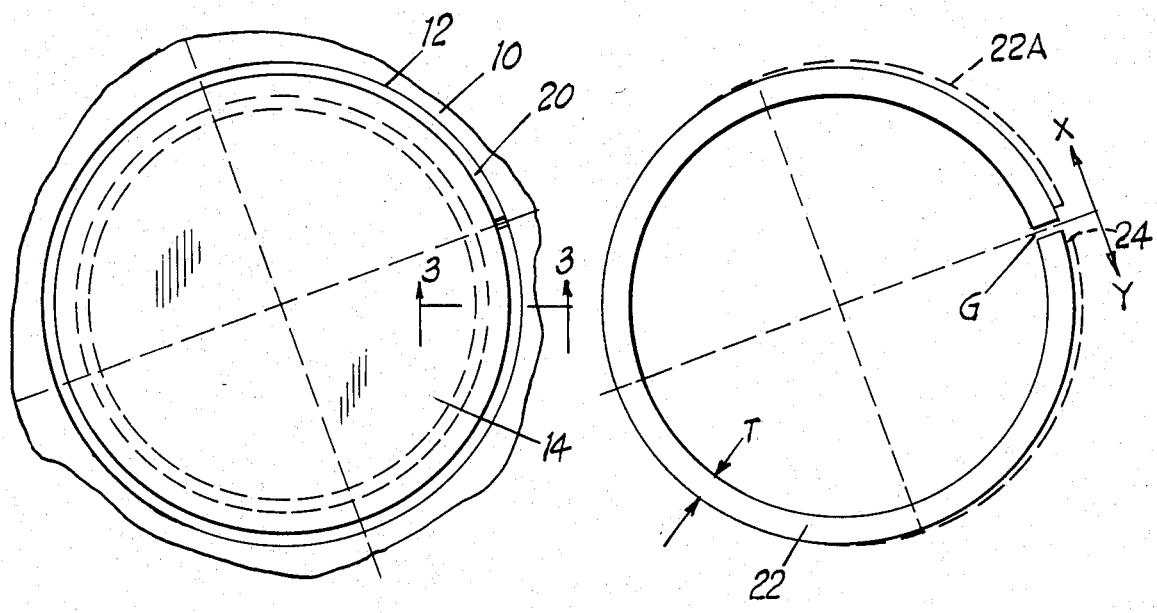
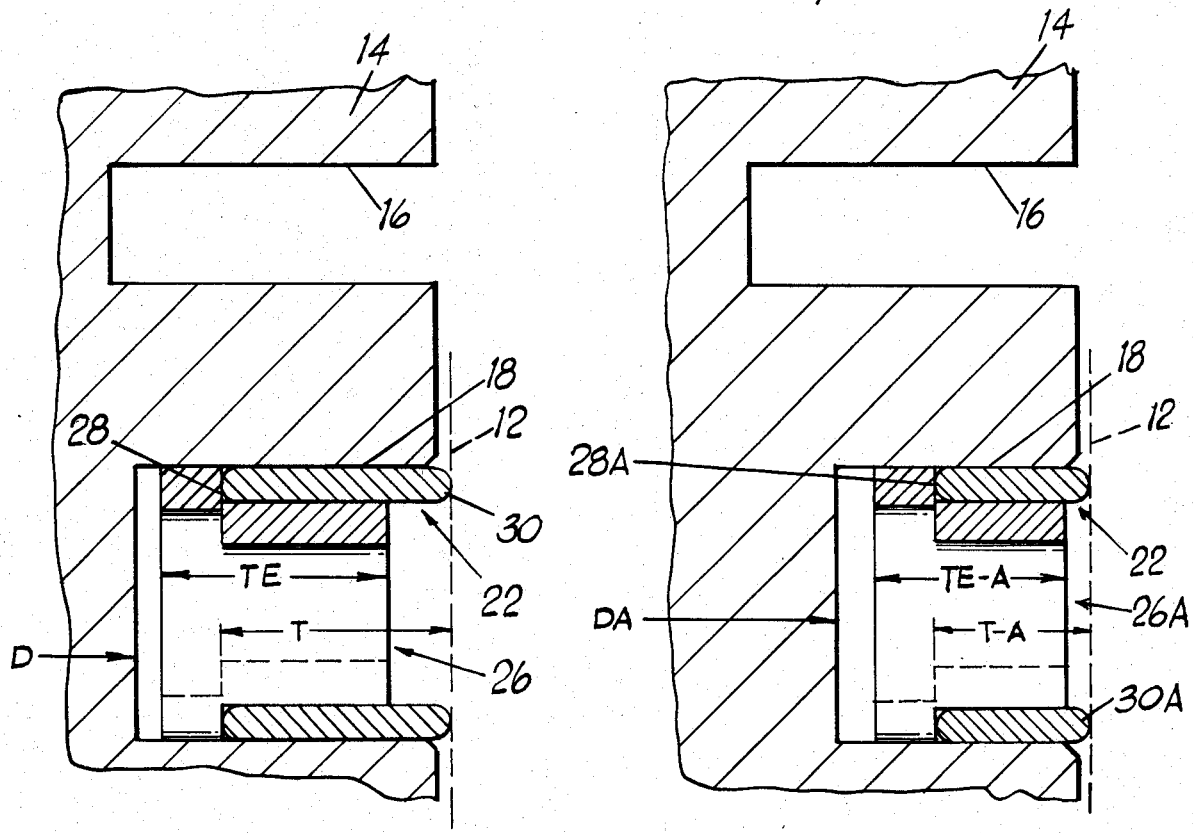

PISTON AND OIL CONTROL RING THEREFOR

OUTLINE OF INVENTION

The piston ring of this invention has the same general shape and function as the rings shown in U.S. Pat. Nos. 2,904,377 to Endres and 3,814,444 to Johnson. The inventive concept lies in materially reducing the radial dimensions of the expander and rails of the ring and the depth of the groove which receives the ring. The radial wall thickness of the rails is reduced by roughly one third the corresponding dimension of prior rails. The radial wall thickness of the corrugated expander is reduced by roughly 16 percent of prior expanders. The depth of the groove in the piston is correspondingly reduced. The unexpected advantages of these reductions are pointed out in the following description.

DETAILED DESCRIPTION

The drawings, of which there is one sheet, illustrate a preferred form of the invention and its relationship to the corresponding prior art.

FIG. 1 is a top plan view conventionally illustrating the end of a cylinder in an internal combustion engine with a piston and piston rings therein.

FIG. 2 is a plan view of a rail of an oil control ring adapted to be installed in the engine in FIG. 1.

FIG. 3 is a fragmentary radial and axial cross sectional view taken along the plane of the line 3—3 in FIG. 1 and showing a prior art oil control ring operatively installed in the piston.

FIG. 4 is a fragmentary radial and axial cross sectional view corresponding to FIG. 3 but showing the oil control ring of the present invention installed in a piston in which the groove for the oil ring has been changed and adapted for the new oil ring.

As is shown in FIGS. 1 and 3, internal combustion engines having blocks 10 and bores 12 for the several cylinders of the engine are old. The pistons 14 which reciprocate in the cylinders have grooves 16 and 18 cut around their periphery. Grooves 18 receive oil control rings generally indicated at 22.

The sizes and shapes of the piston rings, and the grooves in which they operate have been more or less standardized; and the nomenclature for designating significant dimensions and factors of the rings and grooves are set forth in Standards adopted and published by the Society of Automotive Engineers. The S.A.E. Standard S.A.E. J929a revised as of July 1977 is referred to as indicating standard automotive thinking and nomenclature at the time of the present invention.

As is shown in FIG. 2, all rings including oil control rings are manufactured in out-of-round shape indicated by the dotted lines 22A with a free gap 24.

A common measurable characteristic of rings is the amount of force necessary, when applied tangentially at the ends of the gap 24, to close the ends of the ring to the operating gap G. This is known as the tangential tension of the ring; and from this factor and the dimensions of the ring, the unit pressure with which the outer faces of the rails bear against the cylinder wall can be calculated.

Significant dimensions of piston rings and piston ring grooves are the radial wall thickness T of the rails 30, and the radial wall thickness TE of the expanders. These combine, with necessary overhang and projection of the rails beyond the side of the piston, and necessary clearance between the inner face of the expander and the root of the groove, to determine the depth of the ring groove. The depth of the ring groove determines a dimension D or groove root diameter for the piston under consideration. When installed in a cylinder the ends of the expander abut so that the rails 30 are radially resiliently pressed against the cylinder by shoulders 28.

It is the discovery of this invention that significant improvements in the operation of an internal combustion engine may be achieved by materially reducing the dimensions T and TE, and increasing the dimension D in a piston and ring assembly, from those established by the S.A.E. standards and other rings commonly used heretofor. It is a correlary of the invention that the operation of an internal combustion engine is materially improved by a significant reduction in the unit pressure which the rails 30 of its oil rings exert against its cylinder walls. A comparison of the forces developed by prior pistons and rings with the corresponding forces of a piston and ring of the invention will point out the extent of the improvements and the changes.

The commonly used pistons and rings referred to above have developed tangential tensions at X-Y of between 14.6 and 30.1 pounds over the same range of piston sizes as the S.A.E. standards. These loads translate into unit pressures of between 173.8 and 250 pounds per square inch. The unit pressure is a major factor in deterining the drag or total force necessary to push the cylinder and rings along the cylinder wall. Prior cylinders and rings have had drags of between 18.4 and 34.9 pounds. Prior grooves 18 for oil rings have had depths or radial dimensions of between 0.200 and 0.225 inches for pistons varying between 3.5 and 5.0 inches in diameter. This resulted in values of D in FIG. 3 which varied between 3.05 and 4.60 inches. Common dimensions for T and TE in FIG. 3 have been of the order of 0.150 inches each, which when combined with necessary overhang had a combined radial dimension of 0.190 inches.

Pistons built according to this invention and having diameters ranging from 2.75 to 5.0 inches have been provided with new ring grooves with depths of between 0.125 and 0.165 inches. This resulted in dimensions DA of between 2.42 and 4.67 inches. Rings tested in these grooves had expander wall thicknesses TE-A of between 0.100 and 0.125 inches and their rail wall dimension T-A was 0.100 inches. The combined radial thicknesses were between 0.115 and 0.140 inches. These developed tangential tensions at X-Y of between 5.2 and 15.2 pounds, and unit pressures of the rings against the cylinders were calculated to be from 61.9 to 126.7 pounds per square inch. The drags of the pistons in the cylinders were between 6 and 12 pounds.

A common and popular size of pistons is 4 inches in diameter, and pistons and rings of this size using the new practice showed the tangential load at X-Y to be between 6 and 12 pounds. The unit pressure was between 62.5 and 125 p.s.i. The drag of the old pistons was 21 pounds as compared to the new piston which had 7 pounds drag.

Comparison tests of five different sets of both new and old rings in a 3.5 inch cylinder produced the following results:

| | Tangential Tens. | Unit Press. | Average Drag |
|---|---|---|---|
| Old | 14.6 min. | 173.8 min. | 18.4 |

-continued

|   | Tangential Tens. | Unit Press. | Average Drag |
|---|---|---|---|
|   | 20.4 max. | 242.9 max. | 27.8 |
| New | 5.2 min. | 61.9 min. | 7.3 |
|   | 10.3 max. | 122.6 max. | 12.0 |
| % reduction | 64 | 67 | 60 |
|   | 49 | 53 | 56 |

Similar comparisons in a 5 inch cylinder are:

| Old |  |  |  |
|---|---|---|---|
|   | 21.6 min. | 180.0 | 18.5 |
|   | 30.0 max. | 250.0 | 39.4 |
| New | 7.5 min. | 62.2 | 0 |
|   | 15.2 max. | 126.7 | 10.7 |
| % reduction | 66 | 65 | 100 |
|   | 49 | 49 | 72 |

Note that the minimum average tension and unit pressure reduced the drag to such an extent that the friction between the piston and the cylinder did not measurably exceed the weight of the 5 inch piston. A light, unmeasurable, pressure to overcome static friction resulted in the piston sliding by gravity through the cylinder.

Comparative operational tests of the old and new types of oil rings, together with regular compression rings, in operating engines showed that oil consumption and blow-by of combustion gases were approximately the same. Improvements in fuel economy of between 2% and 5% with the new rings were noted.

In addition to the immediate improvement in fuel consumption produced with the new rings, other advantages of the new rings will be apparent. The reduction in piston drag and friction will produce less heat, so a smaller coolant pump and radiator may be used. The reduction in drag will permit the use of a smaller and lighter starter. All of these reduce the weight of the engine and will permit associated reductions in the weight of the car body. Note that reduction in the dimensions T and TE reduce the depth of the grooves 18 so that the weight of the pistons may be reduced by enlarging their inner diameters behind the oil rings. This reduction of reciprocating weights will permit reductions in the weights of connecting rods, crank shafts, bearings and engine blocks. Importantly, the reduction in friction will reduce wear in both the cylinder wall and the rings, increasing the life of the engine and its parts near optimum, designed, dimensions.

The following comparisons are noted between groove depths:

| For Cylinder diameters 3.5–5.0 | | |
|---|---|---|
| S.A.E. | New | % Reduction |
| .200 | .155 | 22.5 |
| .210 | .155 | 26.2 |
| .225 | .155 | 31.1 |

| | Groove Diameters As % Of Piston Diameters | | | |
|---|---|---|---|---|
| | Groove Diameters | | % | |
| Piston Diam. | Old | New | Old | New |
| 2.75 | 2.32 | 2.44 | 84.0 | 88.7 |
| 3.00 | 2.60 | 2.67 | 86.6 | 89.0 |
| 3.19 | 2.79 | 2.88 | 87.7 | 90.2 |
| 3.50 | 3.10 | 3.19 | 88.5 | 91.1 |
| 3.75 | 3.35 | 3.42 | 89.3 | 91.2 |
| 4.00 | 3.60 | 3.69 | 90.0 | 92.2 |
| 5.00 | 4.60 | 4.67 | 92.0 | 93.4 |

Combined radial wall thickness of expander and rails as a percentage of piston diameters, using the shallowest S.A.E. ring grooves and common prior dimensions of T plus TE of 0.190 and new values of the invention for TA plus TE-A of 0.140 may be tabulated as follows:

| Pist. Diam. | T plus TE | TA plus TE-A | % Old | % New |
|---|---|---|---|---|
| 2.75 | .190 | .140 | 6.89 | 5.09 |
| 3.00 | " | " | 6.33 | 4.66 |
| 3.50 | " | " | 5.42 | 4.00 |
| 3.75 | " | " | 5.33 | 3.73 |
| 4.00 | " | " | 4.75 | 3.50 |
| 5.00 | " | " | 3.80 | 2.80 |

As is apparent, the percentages of the groove root diameters relative to nominal piston diameters increase as the cylinder diameters increase, and the percentage values of the combined radial thicknesses of the expander and rails relative to the piston diameters decrease as the cylinder diameters increase.

However, if an arbitrary range of percentages of the combined radial wall thickness T-A plus TE-A with respect to the nominal piston diameter is considered as being distributed or extending proportionately over the same range of piston sizes as in the following claims, the claims are believed to distinguish the relatively narrower rings and rail assemblies from those of prior practices, throughout the arbitrary range of piston sizes stated.

While the minimum radial wall thickness T-A of rails 30A tested was 0.100 inches, it is believed that the rail wall thickness of the rail can be further decreased to as little as 0.069. In this connection, the radial tension X-Y of a combined flexible expander and pair of flat rails is considered as being created primarily by the expander, and that the radial wall thickness TE-A may be as large as 0.130 inches and still obtain a substantial portion of the benefits of the invention.

As has already been noted, defining the radial dimension of a ring or groove as a percentage of the piston or cylinder diameter is inconclusive as any single radial dimension becomes a smaller percentage as the diameter increases. However, it is impractical from a manufacturing standpoint to infinitely vary the radial dimensions TE and TE-A. Accordingly, claims are also made to specific radial dimensions and ranges of radial dimensions of the ring parts which will be operative over the range of piston and cylinder sizes of commonly used automotive engines. The projection of the rail TA to seal the clearance between the cylinder wall and the piston is commonly of the order of 0.04 inches, and the minimum clearance between inner face of the expander and the groove root diameter remains as 0.015 inches. The overhang of the rails on the expander and the radial width of the shoulders 28 may vary with different combinations of dimensions of TA and TE-A.

What is claimed to be new and what is desired to be secured by Letters Patent is defined by the following claims:

1. A piston having a nominal diameter in a range of between 2.7 and 5.1 inches with an oil ring groove therearound and an oil ring therein comprising an expander ring with at least one cylinder engaging rail in partially overlapping and radially abutting relation to the expander ring and projecting outwardly of said groove wherein:

the combined radial thickness of the expander ring and the rail expressed as a percentage of the nominal diameter of the coacting piston falls between 2.5% and 7%, the relation of the combined thickness between said percentage limits being approximately the same as that which the nominal diameter of the piston holds in said range of piston diameters.

2. A piston and oil ring as defined in claim 1 in which there are two cylinder engaging rails engaged with opposite axial ends of said expander ring.

3. A piston having a nominal diameter between 2.7 and 5.1 inches with an oil ring groove therearound and an oil ring in said groove comprising an expander ring with a rail supported axially and radially from each end of said expander ring and projecting radially outwardly of said groove wherein:

the inner root diameter of said groove expressed as a percentage of the nominal diameter of the piston falls in a range between 89% and 96%, the particular percentage which said root diameter holds in said range being approximately the same as the position which the nominal diameter of the piston holds relative to said range of piston diameters.

4. A piston and oil ring as defined in claim 3 in which the radial thickness of said expander ring is of the order of 0.100 inches.

5. A piston and oil ring as defined in claim 3 in which the radial thickness of said rails is of the order of 0.100 inches.

6. A piston and oil ring as defined in claim 3 in which the radial thickness of said expander ring and the radial thickness of said rails are each of the order of 0.100 inches.

7. An oil control ring for a piston comprising:
an expander ring and a pair of rails for coaction therewith, said expander ring and said rails each having nominal diameters related to the diameter of the piston with which they are arranged to coact,
said nominal diameter being within the range of 2.7 and 5 inches,
and the combined radial thickness of said expander ring and said rails when in operative relation to a piston, expressed as a percentage of the piston diameter being between 6.5% and 2.5%
the particular percentage of a particular ring between said percentages having a relation within the range of said percentages similar to that which the nominal diameter of the piston holds with respect to said range of diameters.

8. An oil ring as defined in claim 7 in which the radial thickness of said rails is of the order of 0.10 inches.

9. An oil ring as defined in claim 7 in which the radial thickness of said expander ring is of the order of 0.10 inches.

10. An oil ring as defined in claim 7 in which the radial thicknesses of said expander ring and said rails are each of the order of 0.10 inches.

11. A piston having a nominal diameter of between 2.7 and 5.1 inches with a ring groove therearound and a piston ring in said groove comprising an expander ring with at least one cylinder engaging rail in partially overlapped and abutted relation to the expander ring and projecting outwardly of said groove wherein:

the combined radial thickness of the expander ring and the rail expressed as a percentage of the nominal diameter of the coacting piston falling between an upper limit of 6.5% and a lower limit of 2.5%,
and the root diameter of said groove expressed as a percentage of the nominal diameter of the piston falling in a range between 89% and 96%,
the values of said percentages within said limits having approximately the same relation which the nominal diameter of the piston bears to the limit between said 2.7 and 5.0 inches.

12. A piston and piston ring as defined in claim 11 in which the radial thickness of rails is of the order of 0.100 inches and the radial thickness of said expander is of the order of 0.100 inches,
with an overlap between the rails and the expander of the order of 0.060 inches.

* * * * *